(12) United States Patent
Iannone et al.

(10) Patent No.: US 8,003,933 B2
(45) Date of Patent: Aug. 23, 2011

(54) METHOD AND APPARATUS FOR BLOCKING AMBIENT LIGHT IN A LIVE FIBER OPTIC IDENTIFYING DEVICE

(75) Inventors: Patrick P. Iannone, Red Bank, NJ (US); Kenneth C. Reichmann, Hamilton, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 29 days.

(21) Appl. No.: 12/150,678

(22) Filed: Apr. 30, 2008

(65) Prior Publication Data

US 2009/0272883 A1 Nov. 5, 2009

(51) Int. Cl.
*H01J 40/14* (2006.01)
*G01J 1/04* (2006.01)

(52) U.S. Cl. .................... 250/239; 250/227.14

(58) Field of Classification Search .......... 250/239, 250/214 AL, 227.14–227.24; 356/73.1; 385/12, 385/13

See application file for complete search history.

(56) References Cited

U.S. PATENT DOCUMENTS

| 4,759,605 | A | * | 7/1988 | Shen et al. ................ 385/32 |
| 4,765,704 | A | * | 8/1988 | Pers ....................... 385/139 |
| 4,940,891 | A | * | 7/1990 | Rast ..................... 250/227.15 |
| 5,612,780 | A | * | 3/1997 | Rickenbach et al. ....... 356/73.1 |
| 7,283,688 | B2 |   | 10/2007 | Frigo et al. |
| 7,287,913 | B2 | * | 10/2007 | Keenum et al. ............ 385/76 |
| 2005/0041902 | A1 | * | 2/2005 | Frigo et al. ................. 385/1 |

OTHER PUBLICATIONS

LFD-300/TG-300; FiberFinder; Network Testing-Optical; www.EXFO.com; 2007.

* cited by examiner

*Primary Examiner* — Que T Le
*Assistant Examiner* — Pascal M Bui-Pho

(57) ABSTRACT

Spurious light is prevented from entering a cover of an optical fiber identification device by placing an opaque, flexible medium such as brush bristles within optical fiber clearance openings in the cover to block the light path around the fiber. Short opposing lengths of strip brushes are placing on either side of each of the slot openings in the cap. The opposing bristles make contact with each other in the slot, keeping out most ambient light. The strip brushes exert very little force on the fiber, permitting it to bend freely.

7 Claims, 6 Drawing Sheets

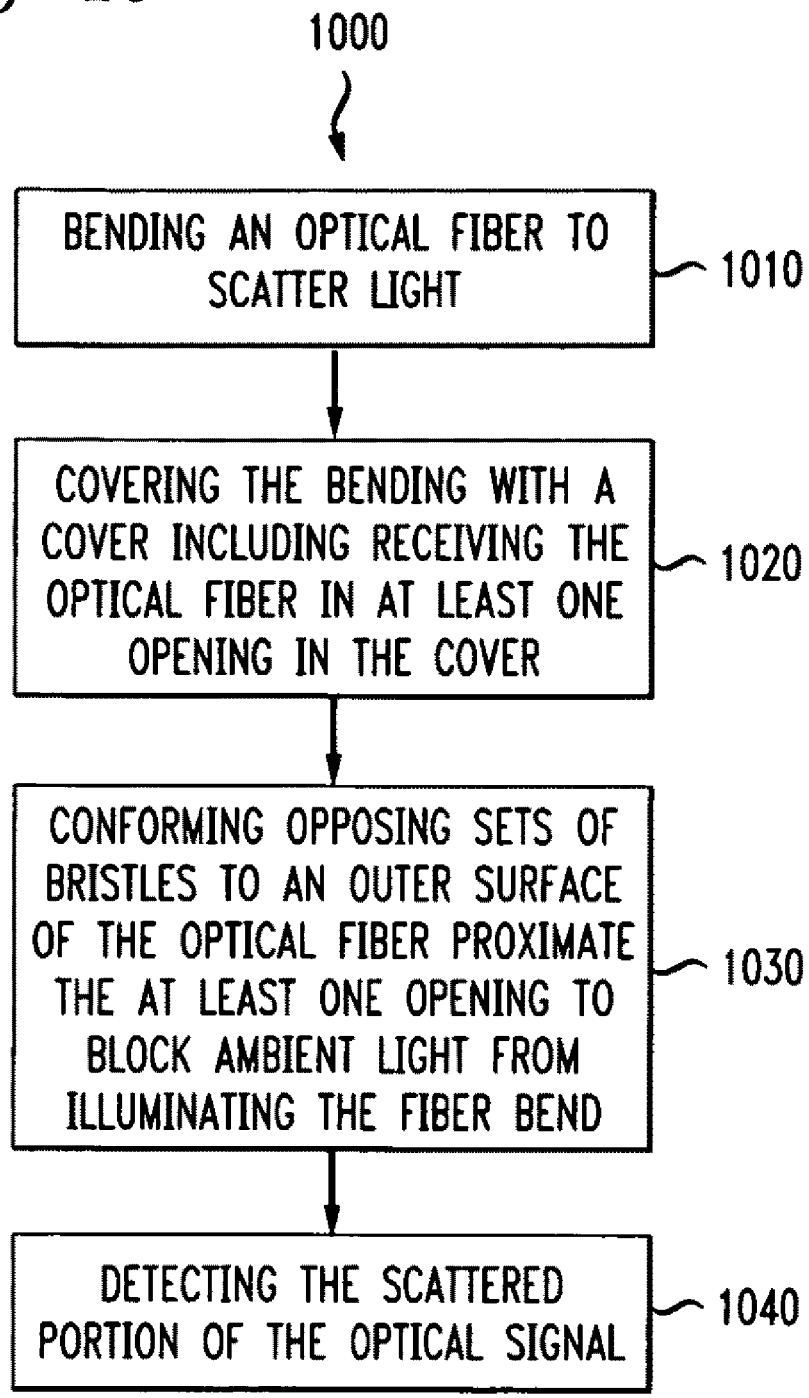

METHOD AND APPARATUS FOR BLOCKING AMBIENT LIGHT IN A LIVE FIBER OPTIC IDENTIFYING DEVICE

FIELD OF THE INVENTION

The present invention relates generally to an instrument for detecting an optical signal in an optical fiber, and more specifically to a method and apparatus for reducing spurious light within the instrument.

BACKGROUND OF THE INVENTION

In the art of optical fiber installation and maintenance, several instruments are currently in use requiring the measurement of relatively weak optical signals in the field. For example, a handheld system is presently in use for pinpointing particular optical fibers containing live traffic. The fibers are identified in a non-intrusive manner, without the necessity to cut or terminate the fibers. That fiber identification system is disclosed in U.S. Pat. No. 7,283,688 to Frigo, Iannone and Reichmann, issued Oct. 18, 2007, the contents of which is hereby incorporated in its entirety herein. A system according to that disclosure is marketed by EXFO Electro-Optical Engineering Inc. of Quebec City, Quebec, Canada under the name FiberFinder™.

The device includes two units: a tone generator and a live fiber detector. The tone generator imparts a time-varying modulation onto an optical signal propagating in the optical fiber by vibrating an actuator to modulate the curvature of a bend of the fiber, thereby generating a time-varying loss of power in the signal. For example, a piezoelectric transducer may be used to impart the signal.

An example live fiber detector 100 is shown in FIG. 1. An optical fiber 110 is bent around a clamping anvil 131, creating a bend in the fiber so that a portion of the optical signal carried by the fiber is scattered out of the fiber into a light guide 151. The scattered light 155 is guided by the lightguide 151 into a detector 121, which converts the received light into an electrical signal that is analyzed to identify the signal and identify the optical fiber 110.

The scattered light 155 is relatively weak and the detector 121 must therefore be sensitive. A cover or cap 140 is used in the field to shield the detector from ambient light that would otherwise compromise the measurement. The cover must allow the fiber 110 to enter the darkened interior, and for that purpose openings 145a, 145b are provided.

The openings 145a, 145b, however, have been found to admit some ambient light, represented in FIG. 1 as arrows 171. That spurious admitted light has been found to significantly degrade the performance of the device 100 by interfering with the measurement of the scattered light 155 from the fiber 110, disrupting the fiber identification process.

The problem is aggravated by the necessity of providing openings 145a, 145b large enough to accommodate the largest optical fiber expected to be identified using the device. The large openings create a large gap around the fiber when a smaller fiber is measured. For example, a device might have an opening large enough for a fiber having a 3 mm outer jacket, but might be used to identify a 900 µm fiber, leaving a gap of over 1 mm around the circumference of the fiber.

Additionally, because the system is designed to operate in an in-line manner on the fiber, the openings 145a, 145b must in practice be slots having open ends for placing over the optical fiber. Longitudinal slots also permit movement of the fiber during the bending process. As compared to round openings, the slots allow additional ambient light to enter the cover.

One approach to solving the problem of ambient light has been to offset the scattered light reading based on an initial ambient light reading. While that technique is effective under certain conditions, it is not completely effective under intense ambient light conditions and under changing ambient light conditions.

There is therefore a need for a low-cost and effective apparatus and method for reducing or eliminating spurious light entering the interior of an optical fiber identification device and interfering with fiber identification. To the inventors' knowledge, no such methods or apparatus currently exist.

SUMMARY OF THE INVENTION

The present invention addresses the needs described above by providing a an apparatus for detection of light in an optical fiber. The apparatus includes a detector for receiving light from the fiber; a cover at least partially surrounding the detector for blocking ambient light from illuminating the detector, the cover defining at least one cover opening for receiving the optical fiber; and a cover opening shield mounted to the cover adjacent the cover opening, the cover opening shield comprising flexible elements extending into the opening to block light, the flexible elements being conformable to an optical fiber placed in the opening.

Another embodiment of the invention is a method for detecting light in an optical fiber. The method includes the steps of bending an optical fiber to create a fiber bend, the fiber bend scattering a portion of an optical signal out of the fiber; covering the bend with a cover including receiving the optical fiber in at least one opening in the cover; conforming opposing sets of bristles to an outer surface of the optical fiber proximate the at least one opening to block ambient light from illuminating the fiber bend; and detecting the scattered portion of the optical signal.

In yet another embodiment of the invention, an apparatus is provided for detecting an optical signal in a non-terminal section of an optical fiber. The apparatus includes a fiber bending device for bending the optical fiber such that a portion of the optical signal is scattered out of the fiber; a detector for receiving at least a portion of the scattered light from the fiber; a cover for at least partially surrounding the detector and the fiber bending device, the cover being for blocking ambient light from being received by the detector, the cover defining two parallel fiber slots having opposing longitudinal walls, each fiber slot being open at one end for receiving the optical fiber when the cover is placed over the optical fiber; and a plurality of strip brush sections, each strip brush section attached to the cover adjacent a longitudinal wall of a fiber slot, each strip brush section comprising bristles having distal ends extending into the respective fiber slot.

BRIEF DESCRIPTION OF THE DRAWINGS

FIG. 10 is a flow chart showing a method according to one embodiment of the invention.

DESCRIPTION OF THE INVENTION

The inventors have discovered that spurious light may be prevented from entering the cover by placing an opaque, flexible medium such as brush bristles within the cover opening to block the light path around the fiber. In a preferred embodiment, opposing lengths of strip brushes are placing on either side of each of the slot openings in the cap. The opposing bristles make contact with or come within close proximity of each other in the slot, keeping out the majority of ambient light. The strip brushes are readily available and, as described below, are easily mounted with a simple modification of the existing cap to hold the brushes in place.

While the invention is described herein with reference to the use of strip brushes as the flexible medium, it is noted that other flexible media could also be used without departing from the scope of the invention. One such embodiment is described below with reference to FIG. 9.

Figure 2:
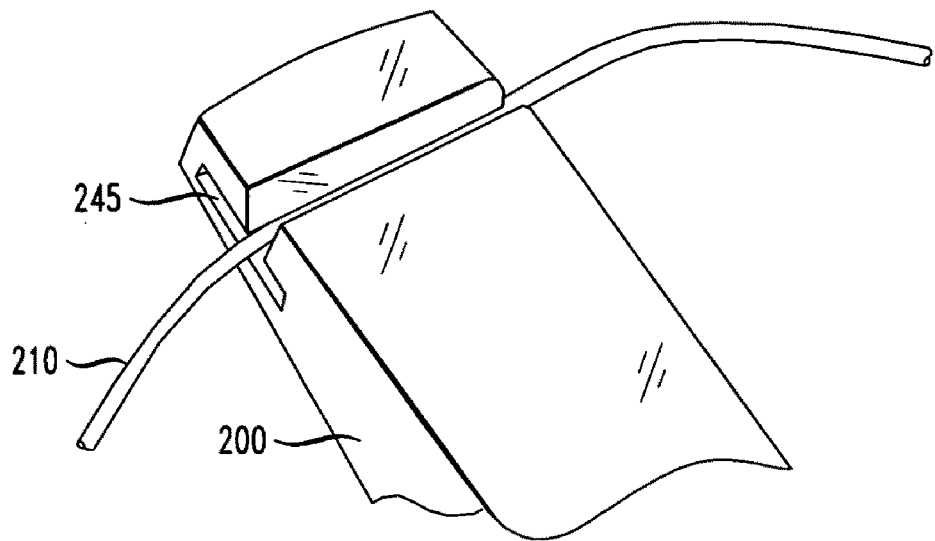
FIG. 2 is partial perspective drawing of an apparatus for measuring scattered light from a fiber.

An existing hand-held device 200 for minimally intrusive fiber testing is shown in FIG. 2. The device includes an opening 245 for inserting an optical fiber 210. The fiber is placed transversely in the device, and access to an end of the fiber is not necessary. Instead, the measurement of scattered light may be performed "in-line" without cutting the fiber and without access to a fiber end. The handheld device 200 may be a device for identifying an in-service optical fiber based on a unique modulation signature imparted elsewhere on the fiber as described above, or may be a live fiber detector used to detect the presence of any optical signal in the fiber.

Figure 1:
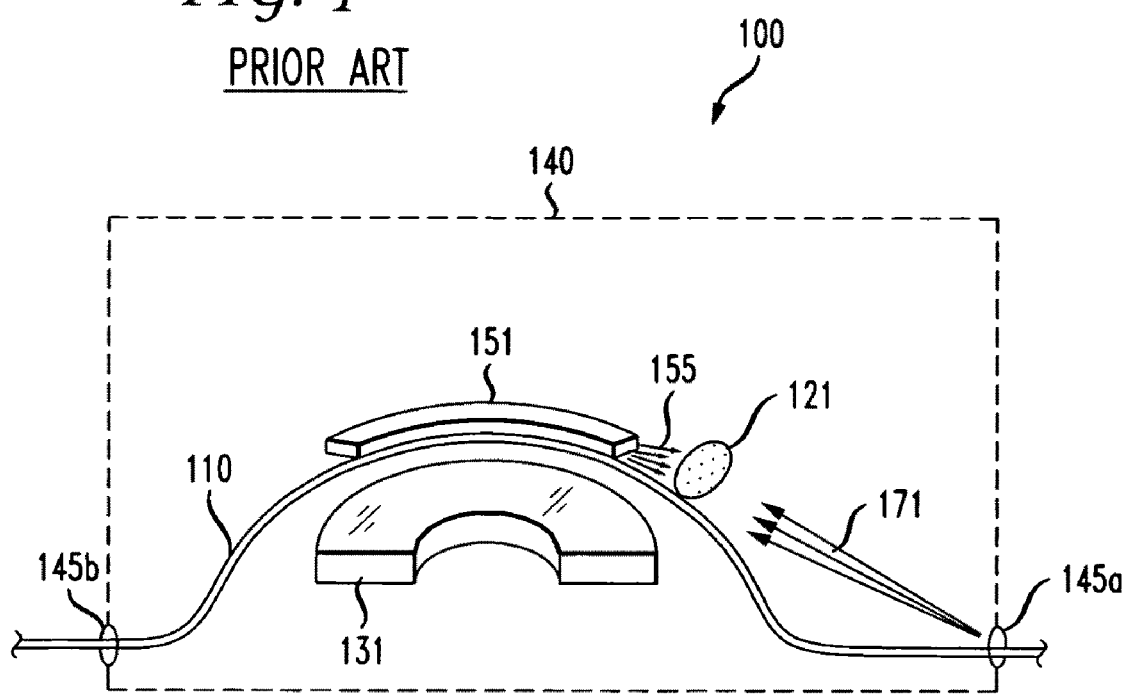
FIG. 1 is a schematic representation of an apparatus for measuring scattered light from a fiber.
Figure 3:
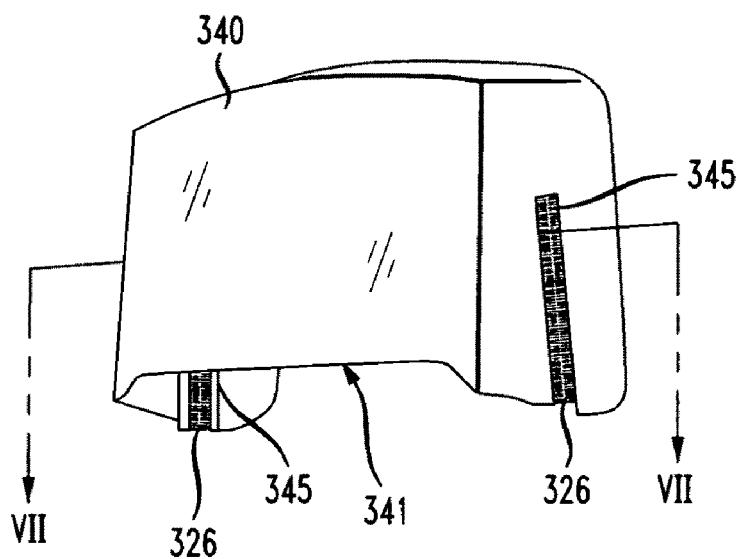
FIG. 3 is a partial perspective drawing of a cover for an apparatus for measuring scattered light from a fiber.

A cover or cap 340 according to the invention is shown in FIG. 3. The device 200 (FIG. 2) is inserted into the interior 341 of the cover 340. The cover 340 has a shape generally conforming to the exterior surfaces of the device 200. The cover additionally has slots 345 on both sides to allow the cover to be placed over the optical fiber 210 (FIG. 2), and to allow the optical fiber to move freely as the fiber is bent to conform the fiber to the anvil 131 (FIG. 1).

Returning to FIG. 3, the inventors have discovered that brush bristles 326 or another flexible medium placed in the slots 345 prevent most of the ambient light striking the slot 345 from entering the interior 341 of the cover 340. The bristles furthermore exert only a very slight force on the fiber, allowing the cap to be installed and removed without moving or damaging the fiber, and allowing the fiber to bend freely for scattering a portion of the optical signal as described above.

Figure 4:
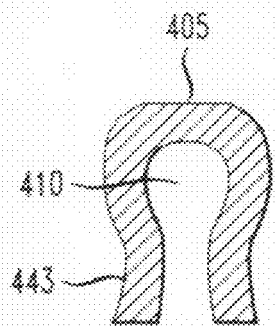
FIG. 4 is a sectional view of a metal channel for retaining brush bristles according to one embodiment of the invention.

The inventors have found that a strip brush is a particularly suitable flexible medium for use in the present invention. Elements of a strip brush used in a preferred embodiment of the invention will be described with reference to FIGS. 4 and 5. A transverse sectional view through a metal channel 405 is shown in FIG. 4. The channel may be formed from strip stock, may be extruded or may be manufactured using other techniques known in the art. The channel includes an enlarged interior region 410 and pinched neck area 443.

Figure 5:
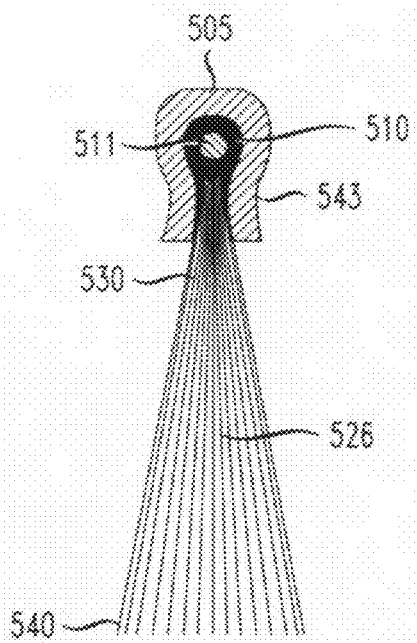
FIG. 5 is a sectional view through a brush according to one embodiment of the invention.

As shown in FIG. 5, brush bristles 526, are retained in a channel 505. In the arrangement shown in FIG. 5, each strand is bent over a rod 511 to form two bristles 526. The rod 511 is trapped in the enlarged interior region 510 by the pinched neck area 543. The bristles 526 extend from the metal channel 505 and have proximal ends 530 and distal ends 540.

Figure 6:
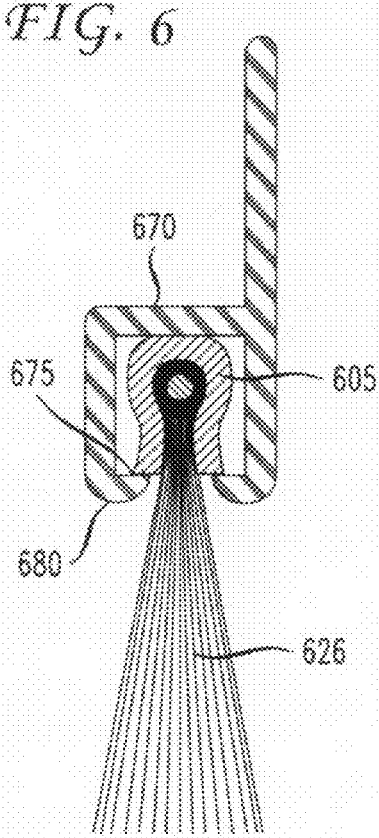
FIG. 6 is a sectional view through a brush installed in a brush channel of a cover according to one embodiment of the invention.

To position and retain the flexible medium in the cap 340 (FIG. 3) a retention channel may be molded into the cap. An exemplary brush retention channel 670 is shown in FIG. 6. An edge 680 of the brush retention channel 670 forms an edge of the slot opening 345 (FIG. 3) of the cap. The brush retention channel 670 includes a pair of retaining edges 675 that bend outward as the metal channel 605 of the strip brush is pressed into the brush retention channel. The retaining edges 675 snap back into place when the strip brush is in position, retaining the brush in the channel 670 with the bristles 626 extending from the channel into the opening.

Figure 7:
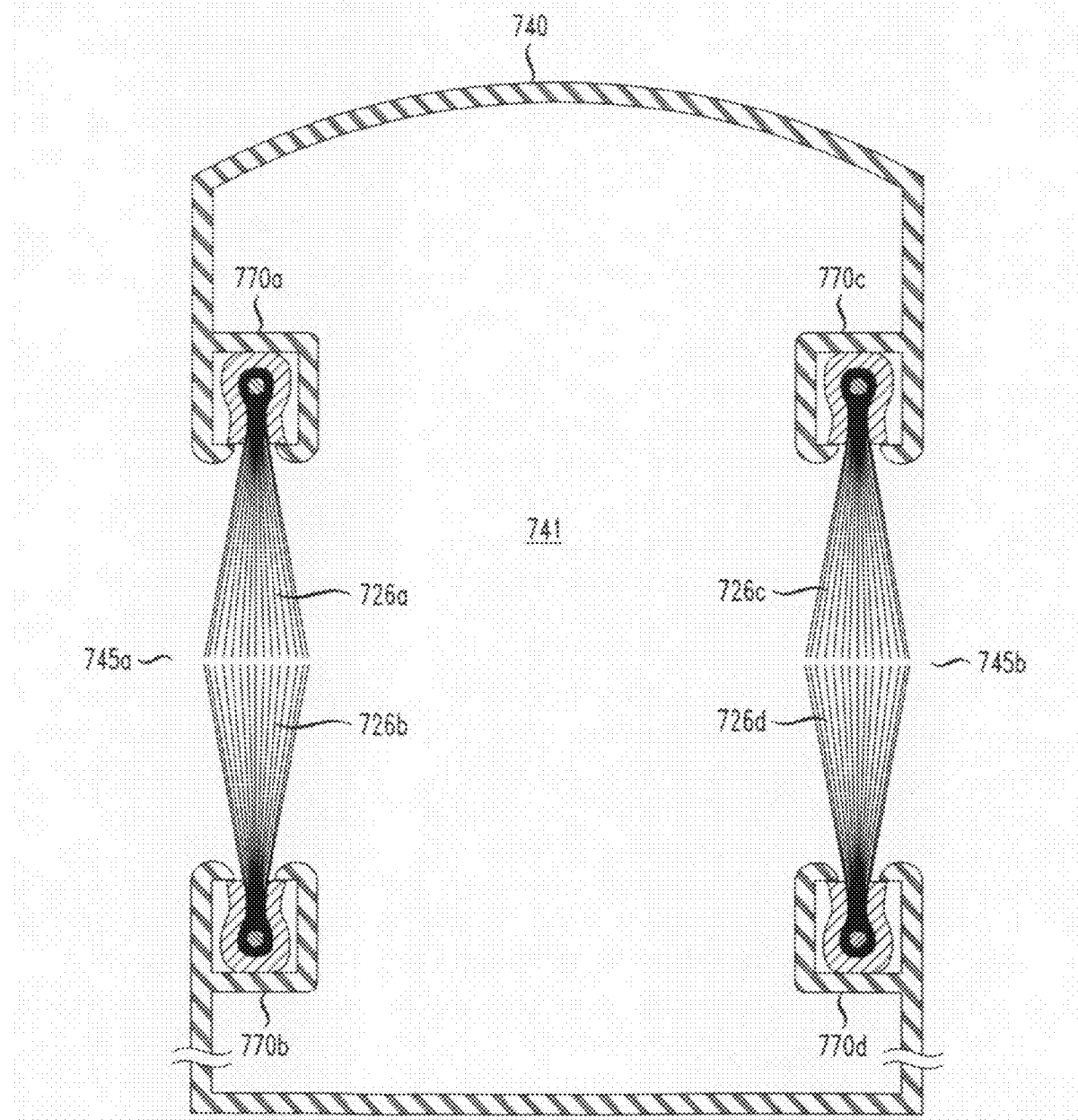
FIG. 7 is a sectional view of a cover according to one embodiment of the invention through line VII-VII of FIG. 3.

A transverse section of the cap 340 of FIG. 3, through line VII-VII, is shown in FIG. 7. The cap, labeled 740 in FIG. 7, encloses an interior 741 and has two openings 745a, 745b. Each opening is bordered by two opposing flexible media. In the embodiment shown, opposing strip brushes 726a, 726b extend into the opening 745a, and opposing strip brushes 726c, 726d extend into the opening 745b. The opposing strip brushes 726a, 726b are mounted in brush retaining channels 770a, 770b, respectively, and strip brushes 726c, 726d are mounted in brush retaining channels 770c, 770d, respectively.

The use of strip brushes 726a-d, as shown in FIG. 7 allows the fiber to move during the bending process, while the strip brush bristles continually surround the fiber blocking out unwanted light. The mechanical operation of the test device is therefore unaffected.

In the embodiment shown in FIG. 7, the distal ends of opposing pairs of brushes are spaced away from each other a very slight distance. That arrangement frees the bristles and reduces forces on the fiber during movement of the fiber in the brush, such as during installation of the cap and bending of the fiber. In an alternate embodiment, the opposing bristles are maintained in contact, assuring better shielding of light.

Figure 8:
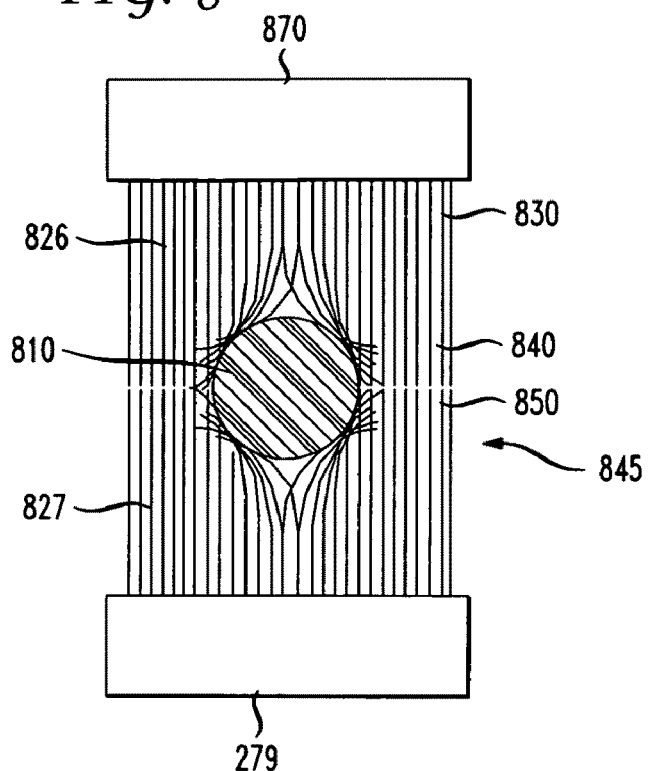
FIG. 8 is a front elevation view of a cover opening according to one embodiment of the invention.

Deformation of the opposing bristles 826, 827 by the optical fiber 810 is shown in the partial view of FIG. 8, which shows a portion of s slot 845 of the inventive device. Distal ends 840 of the bristles 826 are in contact with the opposing bristles 827, at 850. Proximal ends 830 of the bristles 826 extend from the brush retention channel 870; similarly, bristles 827 extend from the brush retention channel 879. Bristles contacting the optical fiber 810 are deformed around the fiber, blocking most light from passing through the slot 845. As the optical fiber 810 moves in the slot, deformed bristles spring back to an non-deformed state, and other bristles deform as they come into contact with the fiber.

Figure 9:
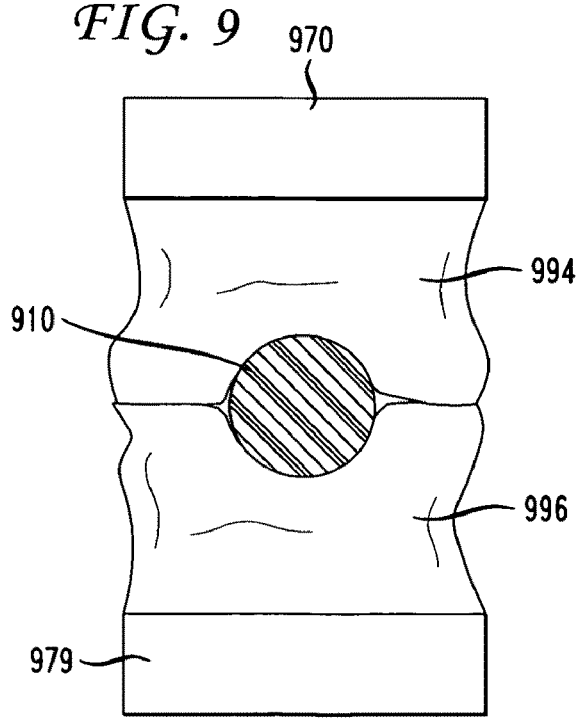
FIG. 9 is a front elevation view of a cover opening according to another embodiment of the invention.

In an alternative embodiment of the invention shown in FIG. 9, the flexible media comprise elastomeric elements 994, 996 extending from channels 970, 979, respectively. The elastomeric elements are thin sheets that deform when contacting the fiber without exerting undue force on the fiber. As the fiber advances to the left or the right as shown in FIG. 9, the elastomeric elements 994, 996 recover their fully extended shape in areas behind the fiber 910, and continue to block light. Other sections of the elastomeric elements deform upon contact with the fiber.

A method for detecting light in an optical fiber according to one embodiment of the invention is shown graphically in the flow chart of FIG. 10. An optical fiber is bent (step 1010) to create a fiber bend. The fiber bend scatters a portion of an optical signal out of the fiber. The bend is then covered (step 1020) with a cover. The optical fiber is received in at least one opening in the cover. Opposing sets of bristles are conformed (step 1030) to an outer surface of the optical fiber proximate the at least one opening to block ambient light from illuminating the fiber bend. The scattered portion of the optical signal is then detected (step 1040).

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, although the present disclosure has concentrated on instruments for detecting optical signals at in-line positions along a fiber, the invention may also be used in the case of instruments that measure weak signals at the terminus of the fiber. Further, while the invention has been described in conjunction with a device for identifying an optical fiber by detecting a unique modulation signature imparted elsewhere on the fiber, the light shielding method and apparatus of the invention may be used with other instruments for detecting optical signals in the field. It is to be understood that the embodiments shown and described herein are only illustrative of the principles of the present invention and that various modifications may be implemented by those skilled in the art without departing from the scope and spirit of the invention.

What is claimed is:

1. An apparatus for detecting an optical signal in a non-terminal section of an optical fiber, comprising:
   a fiber bending device for bending the optical fiber such that a portion of the optical signal is scattered out of the fiber;
   a detector for receiving at least a portion of the scattered light from the fiber;
   a cover for at least partially surrounding the detector and the fiber bending device, the cover being for blocking ambient light from being received by the detector, the cover including a substantially planar first side having a first pair of facing rectilinear edges defining a first cover opening through the first side, the first cover opening having an open end at terminal ends of the first pair of facing rectilinear edges for receiving the optical fiber, the cover further including a substantially planar second side having a second pair of facing rectilinear edges defining a second cover opening through the second side, the second cover opening having an open end at terminal ends of the second pair of facing rectilinear edges for receiving the optical fiber, the cover having a U-shaped section between the first and second sides; and
   at least first and second cover opening shields mounted to the cover and adjacent the cover openings, the cover opening shields comprising brush bristles arranged in an elongated strip, the elongated strip being parallel to the rectilinear edges defining the cover openings, the brush bristles extending into the openings to block light, the brush bristles being conformable to an optical fiber placed in the openings.

2. The apparatus of claim 1, wherein distal ends of brush bristles extending into the openings are in contact.

3. The apparatus of claim 1, wherein the cover opening shields further comprise a metal channel for supporting proximal ends of the bristles.

4. The apparatus of claim 3, wherein the cover further comprises pre-molded brush slots proximate the cover openings for receiving the metal channels.

5. A method for detecting light in a non-terminal section of an optical fiber, comprising:
   placing a fiber testing device over the non-terminal section of the optical fiber;
   placing a cover over the fiber testing device and the non-terminal section of the optical fiber without access to an end of the optical fiber, by receiving the fiber testing device into an interior of the cover and receiving the optical fiber in each of a first elongate slot in a first side of the cover and a second elongate slot in a second side of the cover, the first and second sides being separated by the interior of the cover, the interior being defined by the first and second sides and by a U-shaped structure between the first and second sides, the two elongate slots receiving the fiber at two locations along the fiber that delineate the section of the fiber;
   conforming bristles of opposing pairs of elongate strip brushes, each elongate strip brush having a longitudinal axis and being proximate one of the two elongate slots, to an outer surface of the optical fiber to block ambient light from illuminating the section of the fiber, the optical fiber initially contacting the bristles proximate an end of the longitudinal axis of the strip brush, and the optical fiber deforming successive opposing sets of bristles of the strip brush along the longitudinal axis as the cover is placed over the optical fiber;
   bending the section of the optical fiber to create a fiber bend, the fiber bend scattering a portion of an optical signal out of the fiber;
   permitting movement of the fiber along the two elongate slots as the fiber is bent, the movement deforming and un-deforming successive opposing sets of bristles of the opposing pairs of elongate strip brushes as the fiber moves along the strip brushes and into and out of contact with the bristles, the opposing sets of bristles blocking the ambient light during the movement; and
   detecting the scattered portion of the optical signal.

6. The method of claim 5, wherein the conforming of opposing sets of bristles is performed concurrently with covering a section of the optical fiber.

7. The method of claim 5, further comprising:
   imparting a time-varying modulation onto an optical signal propagating in the optical fiber; and
   identifying the optical fiber by identifying the time-varying modulation.

* * * * *